United States Patent
Kasztenny et al.

(10) Patent No.: US 6,420,875 B1
(45) Date of Patent: Jul. 16, 2002

(54) CVT TRANSIENT FILTER

(75) Inventors: Bogdan Z. Kasztenny, Markham; Vince Asaro, Scarborough, both of (CA)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/532,883

(22) Filed: Mar. 22, 2000

(51) Int. Cl.$^7$ ................................................ G01R 31/08
(52) U.S. Cl. ............................ 324/522; 324/127; 327/56
(58) Field of Search .................................. 324/403, 522, 324/126, 607, 556, 649, 663, 127; 316/16; 327/77, 309, 362, 56, 67, 565; 340/662

(56) References Cited

U.S. PATENT DOCUMENTS

| | | |
|---|---|---|
| 3,870,926 A | 3/1975 | Hughes |
| 4,196,388 A | 4/1980 | Weller et al. |
| 4,327,390 A * | 4/1982 | Despiney ..................... 361/16 |
| 4,437,134 A | 3/1984 | Dupraz |
| 4,763,068 A | 8/1988 | Schmitt et al. |
| 4,803,382 A * | 2/1989 | Tanimoto ..................... 327/77 |
| 5,485,292 A * | 1/1996 | Wong ......................... 327/56 |
| 5,729,477 A | 3/1998 | Baudart et al. |

FOREIGN PATENT DOCUMENTS

DE 19514 95 10/1996

* cited by examiner

Primary Examiner—Michael Sherry
Assistant Examiner—Trung Q. Nguyen
(74) Attorney, Agent, or Firm—Hunton & Williams

(57) ABSTRACT

A two-stage filter for a circuit protection device. The filter includes a first filtering device connected to receive an input signal v, the first filtering device generating an intermediate signal v1, wherein $$v_{1(k)} = \sum_{n=0}^{20} h_n \cdot v_{(k-n)},$$

where k is a sample index and h0 . . . h20 are first filter coefficients. A second filtering device filters the intermediate signal to generate an output signal v2, wherein $$v_{2(k)} = \sum_{n=0}^{74} g_n \cdot v_{1(k-n)},$$

where $g_0$ . . . $g_{74}$ are second filter coefficients. A Fourier algorithm is applied to the output signal to generate a control signal for the circuit protection device.

21 Claims, 6 Drawing Sheets

CVT TRANSIENT FILTER

BACKGROUND OF THE INVENTION

The present invention generally relates to digital measurements of voltage phasors for protective relaying purposes in situations when voltage signals are brought to a protective relay via Capacitive Voltage Transformers (CVTs). More particularly, the present invention improves the dynamic accuracy of phasor measurements so that the distance and directional protection elements of microprocessor-based relays are faster and more accurate.

Microprocessor-based protection devices for power systems operate by sampling the input currents and/or voltages at regular time intervals, measuring digitally selected features of those signals—primarily magnitudes and phase angles—and comparing the signal features one against another or against thresholds. For proper functioning, the voltage and current phasors must be measured quickly and accurately.

In High Voltage (HV) and Extra High Voltage (EHV) power systems, CVTs are often used to reduce the voltages from the range of hundreds of thousands of volts (primary voltage level) to tens of volts (secondary voltage level) before supplying the voltage signals to measuring and protective devices. CVTs are typically cheaper than magnetic voltage transformers, but cause certain problems for protective relays as they add specific transient components to the original high voltage signals when transforming the voltages to the secondary level.

U.S. Pat. No. 3,870,926 discloses a typical CVT consisting of a capacitive voltage divider, tuning reactor, step-down transformer and ferroresonance suppression circuit. During faults on power system transmission lines, when the primary voltage collapses and the energy stored in the stack capacitors and the tuning reactor of a CVT is to be dissipated, the CVT generates severe transients affecting performance of protective relays.

CVT-generated transients tend to have relatively significant magnitudes and long durations. This becomes particularly important for relays protecting transmission lines when the Source Impedance Ratio (SIR—the ratio between the system equivalent impedance and the relay reach impedance) is large. Under large SIRs the primary voltage during line faults is very low. This signal is crucial for protective relays to operate properly, but it is significantly distorted by components generated not by the power system itself, but by the CVTs. Generally, the CVT generated transients are referred to as the d.c. (direct current) component, although, as a matter of fact, there may be multiple components generated by a CVT and some of them may be oscillatory (a.c. (alternating current) components).

CVT transients affect all the voltage related functions of a protective relay. It is particularly important, however, for distance and directional functions.

When the well-known Fourier algorithm is applied to voltage phasor measurements, which is typical in microprocessor-based relays, the magnitude of the voltage may be significantly underestimated due to the CVT transients. This causes distance elements of the relay to malfunction.

Likewise, the phase angle of the voltage phasor is not measured precisely due to the CVT transients. This causes the directional elements of the relay to malfunction.

Electromechanical relays cope with unfavorable CVT transients thanks to the natural mechanical inertia at the expense of slower operation.

Known methods for dealing with CVT transients in microprocessor-based protective relays is to introduce certain, either fixed or adaptable, delay into a relay, or to reduce the reach of distance elements either permanently or in an adaptive manner.

U.S. Pat. No. 4,763,068 discloses an apparatus for measuring the alternating component of the voltage signal supplied via a CVT. The approach is based on an analog circuit, and as such is not a cost efficient mean of dealing with CVT transients in microprocessor-based protective relays. In addition, the method assumes a d.c. nature of the CVT transient when reconstructing the disturbing component and subtracting it from the input voltage in order to obtain the a.c. component alone. As mentioned above, some CVTs produce oscillatory transients, and consequently, the method disclosed in the '068 patent is not accurate for such CVTs.

U.S. Pat. No. 5,729,477 discloses a method for eliminating a disturbing component from CVT supplied voltage signals. The method is intended to be implemented on a microprocessor-based device and relies on calculating the parameters of the d.c. component present in the input signal and subtracting the reconstructed d.c. component from the input signal. Since the method requires digital measurements at two time instances only, it is clear that the method can deal only with one component, this component must be an exponentially decaying d.c. component and its time constant must be known. Because of the above limitations, the method described in the '477 patent does not address the aforementioned problems sufficiently.

U.S. Pat. No. 4,196,388 discloses an apparatus for removing disturbing components from the CVT supplied voltage signal by means of switchable analog filters. The apparatus uses two different analog filter modes: one with wide frequency response (and consequently, fast time response), and one with narrow bandwidth (and consequently, slow time response). The apparatus includes a mechanism for automatic control of the bandwidth. By narrowing the bandwidth of the filter during power system faults, the apparatus introduces certain delay to the voltage signal. This affects performance of protective relays by slowing them down. In addition, the apparatus, as an analog device, can not be used directly by microprocessor-based relays on a cost efficient basis.

U.S. Pat. No. 4,437,134 discloses an apparatus for fast discharge of the energy trapped in the stack capacitors of a CVT. The apparatus uses a special circuit comprising of semiconductor devices and a separate detector switching the first circuit on when needed. The apparatus, as an analog device, is rather an enhancement of CVT design, and cannot be used directly by microprocessor-based relays on a cost efficient basis to cope with problems caused by regular CVT designs.

SUMMARY OF THE INVENTION

In view of the above, it would highly desirable to provide a numerical algorithm for pre-filtering a CVT supplied voltage signal which would provide good filtering regardless of the CVT type including values of stack capacitors, type of the ferroresonance suppression circuit, type and value of the burden. It would further be described to provide a filter which introduces minimal time delay. It would also be desirable for a filter to provide optimal performance both magnitude-wise and phase-wise of the commonly used Fourier algorithm when the latter is applied to the pre-filtered voltage signal.

To achieve these goals, and provide other advantages, embodiments of the present invention provide a linear Finite Time Response (FIR) digital filter to pre-filter CVT supplied voltages prior to application of the Fourier algorithm and other functions of a microprocessor-based protective relay.

The filter can be designed as a cascade of two FIR filters. A first stage of the filter suppresses decaying d.c. components and the oscillatory decaying components of the frequency lower than the power system frequency (50 or 60Hz). A second stage of the filter provides a dynamic memory by using certain number of historical samples of the voltage signal, averaging the results, and using the average to effectively compose the output signal of the filter.

The filter does not need to be tuned to a particular CVT; thus the CVT characteristic is not necessary to apply the filter, and consequently, the filter is universal.

The filter introduces minimal time delay, and as such, it does not slow down the operation of protective relays unnecessarily.

As a result of pre-filtering the magnitude of the voltage phasor as measured by the Fourier algorithm is underestimated only minimally, and the phase angle of the voltage phasor is measured much more accurately compared to the Fourier algorithm used on raw samples of the CVT supplied input voltage.

A microprocessor-based relay implementing the presented invention provides improved performance of distance and directional protection elements.

BRIEF DESCRIPTION OF THE DRAWINGS

The present invention and its resulting advantages can be more fully understood by reading the following Detailed Description in conjunction with the accompanying drawings, in which.

DETAILED DESCRIPTION OF THE INVENTION

Figure 1:
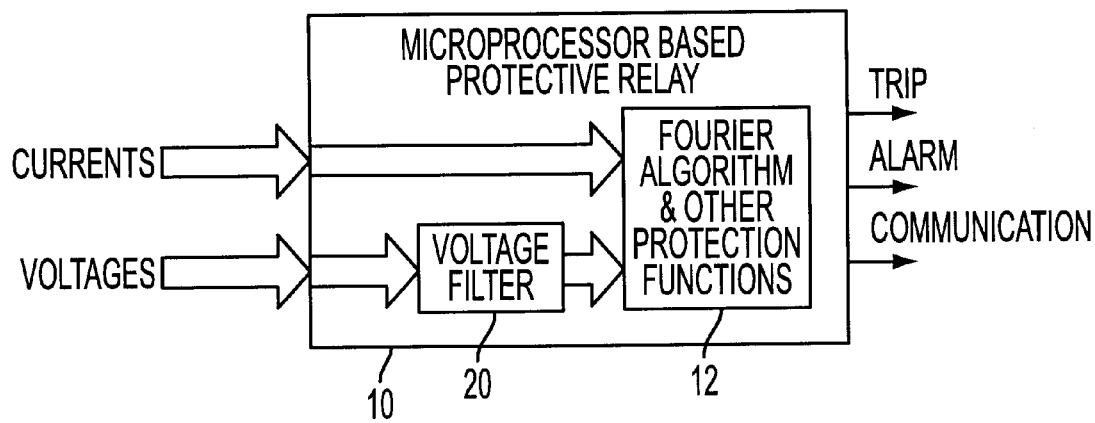
FIG. 1 is a block diagram of an exemplary pre-filter in a microprocessor-based protective relay.

Referring to FIG. 1, a microprocessor-based protective relay 10 includes a filter 20 and a signal processor 12 which applies the Fourier algorithm and/or other signal processing algorithms to the current or voltage signals provided to the relay 10. The relay 10 outputs protective control signals such as the trip, alarm, and communication signals as shown to initiate various protective control functions for an associated power system (not shown). The filter 20 processes a voltage signal indicative of a present condition of the power system. The voltage signal in this embodiment is received from a capacitive voltage transformer, and is converted from an analog to a digital signal by an appropriate analog-to-digital converter (not shown) of the microprocessor based relay 10. Because capacitive voltage transformers and analog-to-digital converters are well-known, discussion of these elements has been made brief. The filter 20 processes this input digital voltage signal into another digital signal that is fed directly into the Fourier algorithm signal processor 12. The filter 20 of FIG. 1 has been designed for a sampling rate of 64 samples per cycle of the fundamental system frequency, though the filter can easily be designed for other sampling rates.

Figure 2:
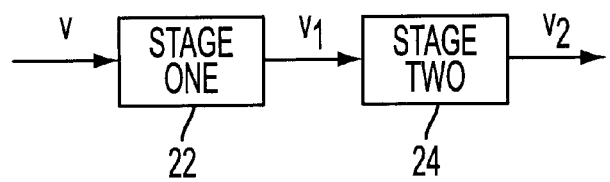
FIG. 2 is a block diagram showing the two stages of the invented filter and the intermediate voltage signals.

As shown in FIG. 2, the filter 20 includes two separate stages 22 and 24, both of which are preferably implemented as linear Finite Time Response (FIR) digital filters under the control of a suitably programmed microprocessor. First stage 22 processes the input signal v into the intermediate signal $v_1$. A microprocessor associated with the relay of FIG. 1 performs the following operation in first step 22 of the filter 20:

$$v_{1(k)} = \sum_{n=0}^{20} h_n \cdot v_{(k-n)} \quad (1)$$

where k is a sample index, and $h_0 \ldots h_{20}$ are coefficients of the first stage 22.

This first stage 22 effectively suppresses decaying d.c. components of the input voltage signal and the oscillatory decaying components at frequencies lower than the power system frequency (e.g., 50 or 60 Hz).

Second stage 24 processes the intermediate signal $v_1$ into an output signal $v_2$. The following operation is performed by a microprocessor associated with the relay 20 to accomplish the second stage 24 of the filter:

$$v_{2(k)} = \sum_{n=0}^{74} g_n \cdot v_{1(k-n)} \quad (2)$$

where $g_0 \ldots g_{74}$ are coefficients of the stage two of the filter.

This second stage 24 provides a dynamic memory by using a certain number (in this example, 74) of historical samples of the input voltage signal, averaging the results, and using the average to effectively compose the output signal of the filter.

Operations (1) and (2) are combined and the final implementation equation for the filter of FIG. 2 is as follows:

$$v_{2(k)} = \sum_{n=0}^{94} b_n \cdot v_{(k-n)} \quad (3)$$

The microprocessor associated with the protective relay 10 applies, using signal processor 12, a Fourier algorithm to the output of the second stage 24, and generates appropriate signals such as trip signals, alarm signals, or communication signals based on the filtered voltage signal. The signal processor 12 is also connected to receive current signals indicative of the present condition of the power system, and to generate appropriate output protective control signals based on the current signal.

The digital filtering can be performed under the control of the suitably-programmed microprocessor. The microprocessor can be programmed to execute instructions encoded on a machine-readable storage medium (an internal memory, for example) to receive and process the input voltage signal in the above-described manner.

Figure 3:
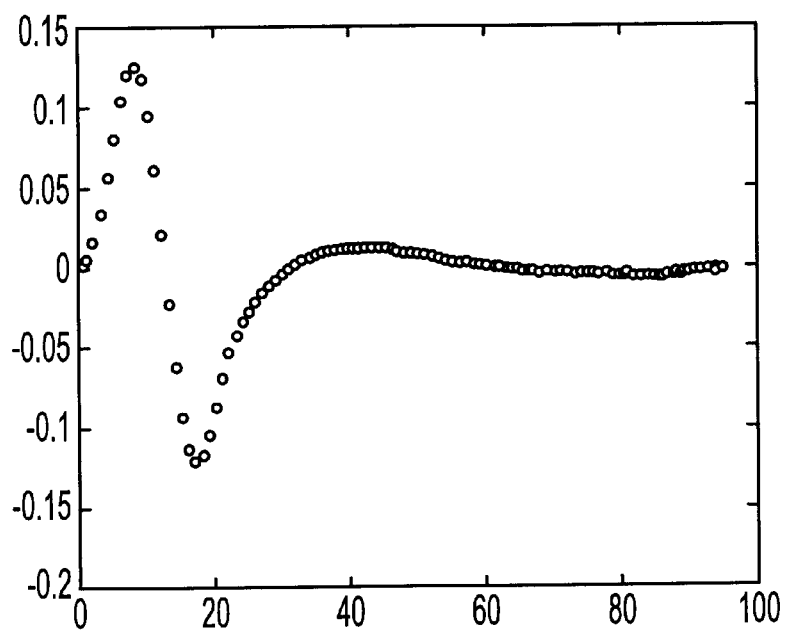
FIG. 3 is a plot of coefficients of the invented filter.

Referring now to FIG. 3, a graph of the coefficients b of the filter 20 are shown. The figure presents the plot of the coefficients of the filter (3). The x-axis shows a sample number index (n), while the y-axis shows weighting numbers b for a given sample.

Figure 4:
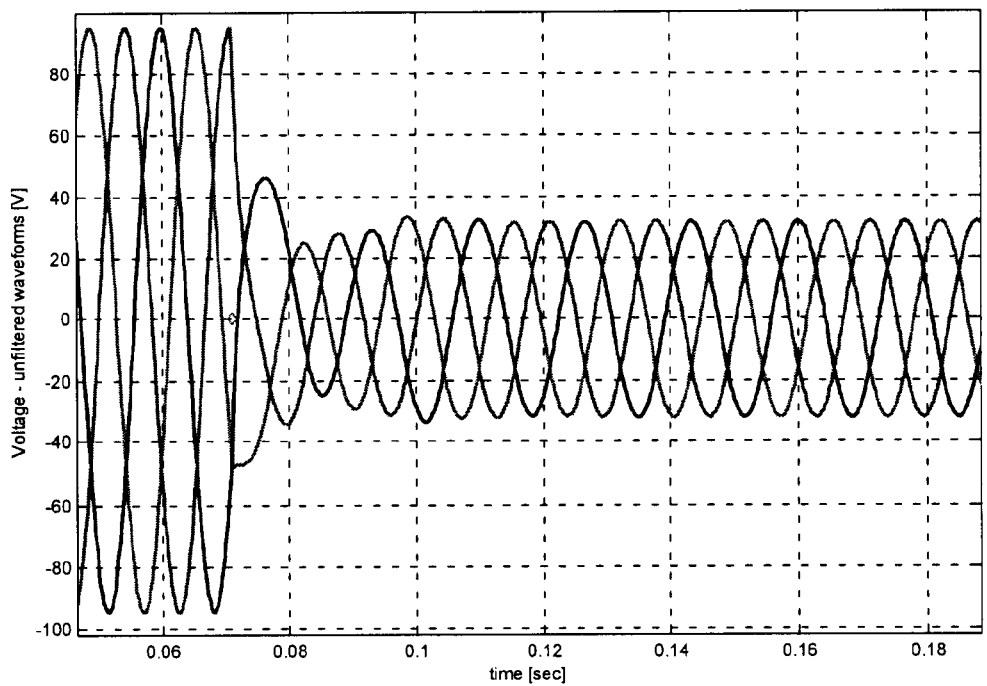
FIG. 4 is a sample plot of heavily distorted, three phase secondary voltages of one CVT over time during a fault on one power system transmission line.

FIGS. 4–11 illustrate the benefits of a filter according to the present invention. FIG. 4 shows phase voltage signals during a three-phase fault on a transmission line protected by one microprocessor-based relay implementing filter 20. As shown in this plot, filtering is effectively accomplished in less than 0.5 seconds in a representative implementation.

Figure 5:
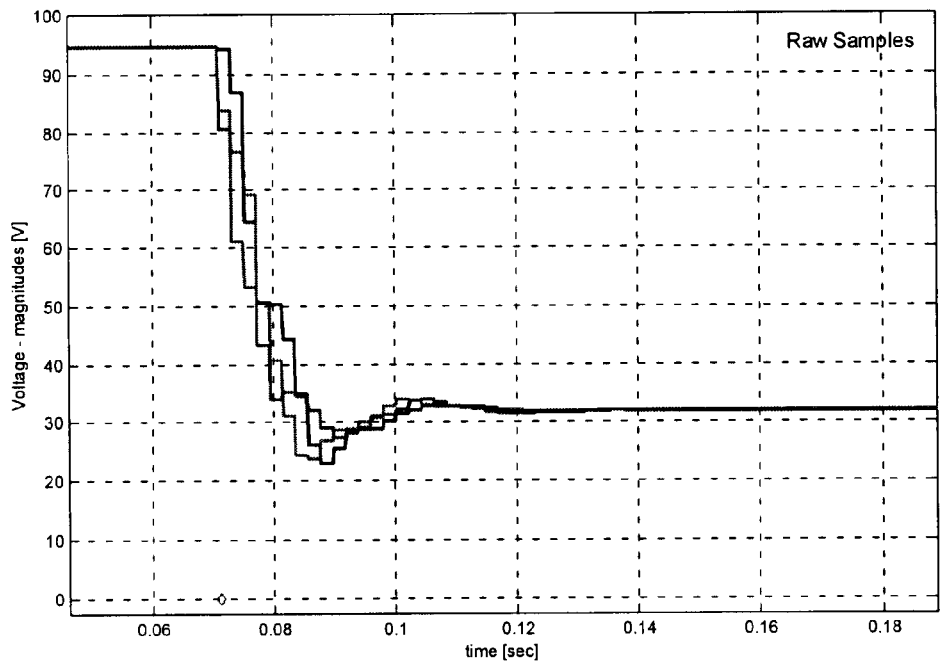
FIGS. 5 and 6 are plots of the magnitudes of the signals of FIG. 4 as estimated by the Fourier algorithm working on raw samples, and the Fourier algorithm working on the signals pre-filtered by a filter according to the present invention, respectively.
Figure 6:
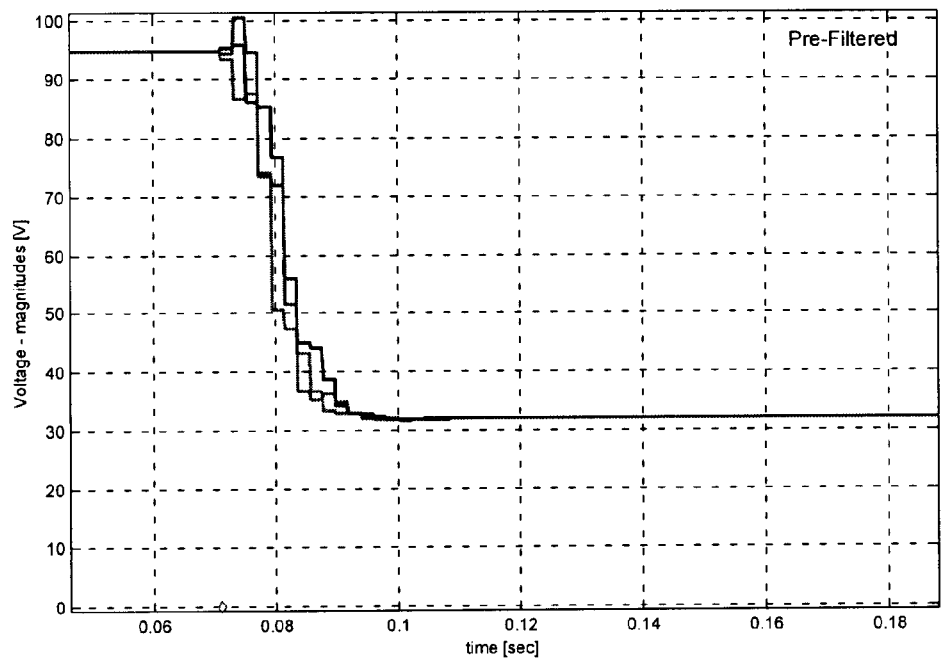

FIGS. 5 and 6 compare a magnitude measurement (as used to estimate the distance to a fault) using the raw input voltage signals (FIG. 5) and using filtered signals according to the filter of FIGS. 1–2 (FIG. 6). As will be appreciated from these plots, the filter prevents underestimation of the magnitude. This, in turn, prevents underestimation of the distance to fault and malfunction of the distance elements of the relay.

Figure 7:
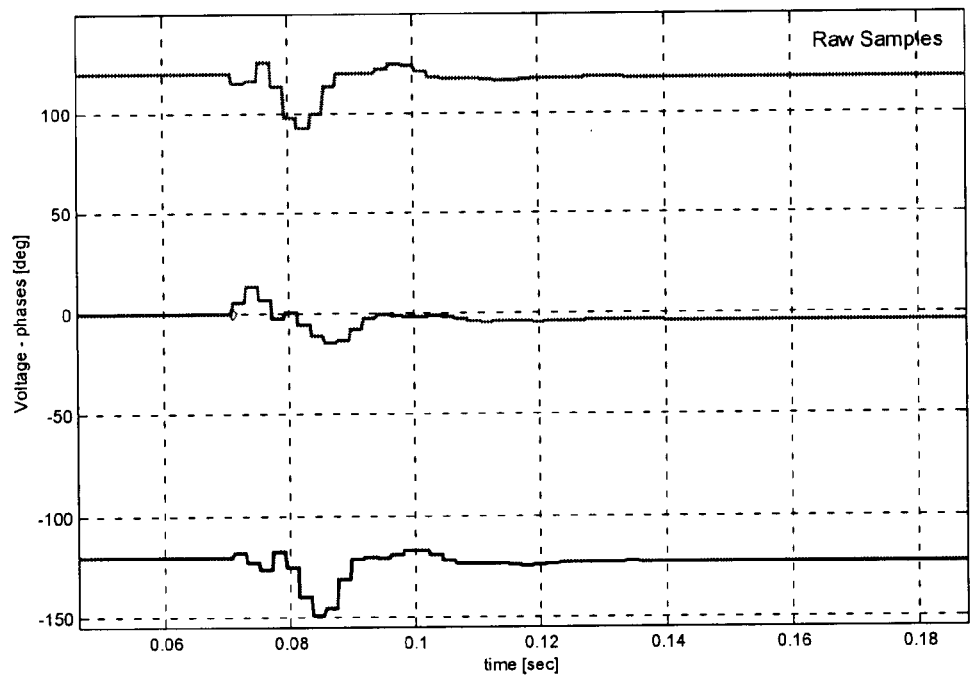
FIGS. 7 and 8 are plots of the phase angles of the signals of FIG. 4 as estimated by the Fourier algorithm applied to raw samples, and the Fourier algorithm applied to signals pre-filtered by a filter according to the present invention, respectively.
Figure 8:
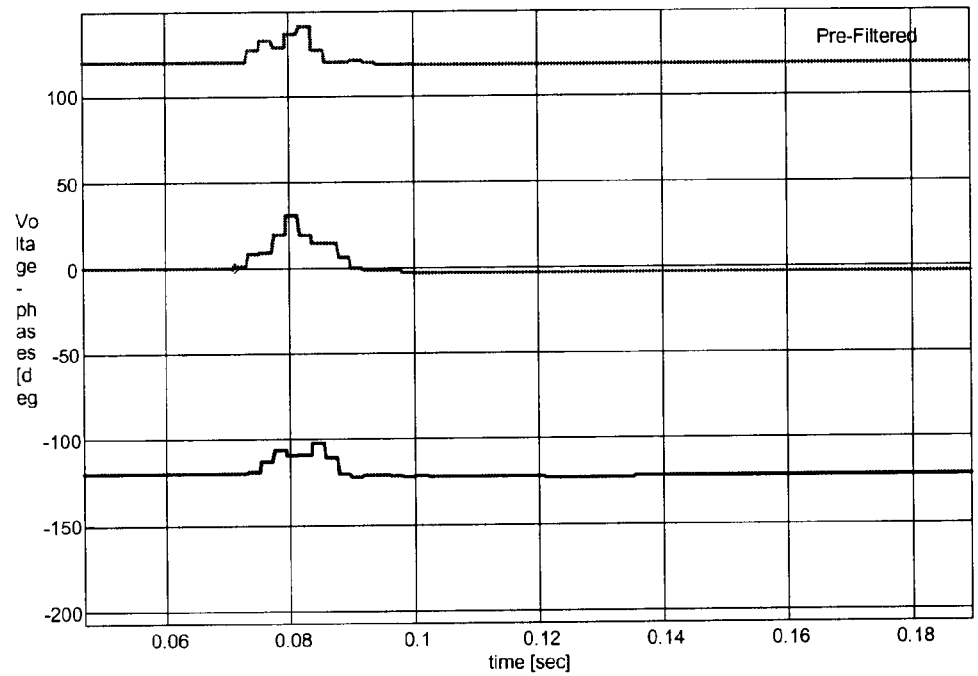

FIGS. 7 and 8 compare a phase angle measurement (as used to determine directional functions of the relay) using raw voltage signals (FIG. 7) and signals pre-filtered according to the filter of FIGS. 1–2 (FIG. 8). The filter ensures significantly smaller transient errors and prevents malfunction of the directional functions of the relay.

Figure 9:
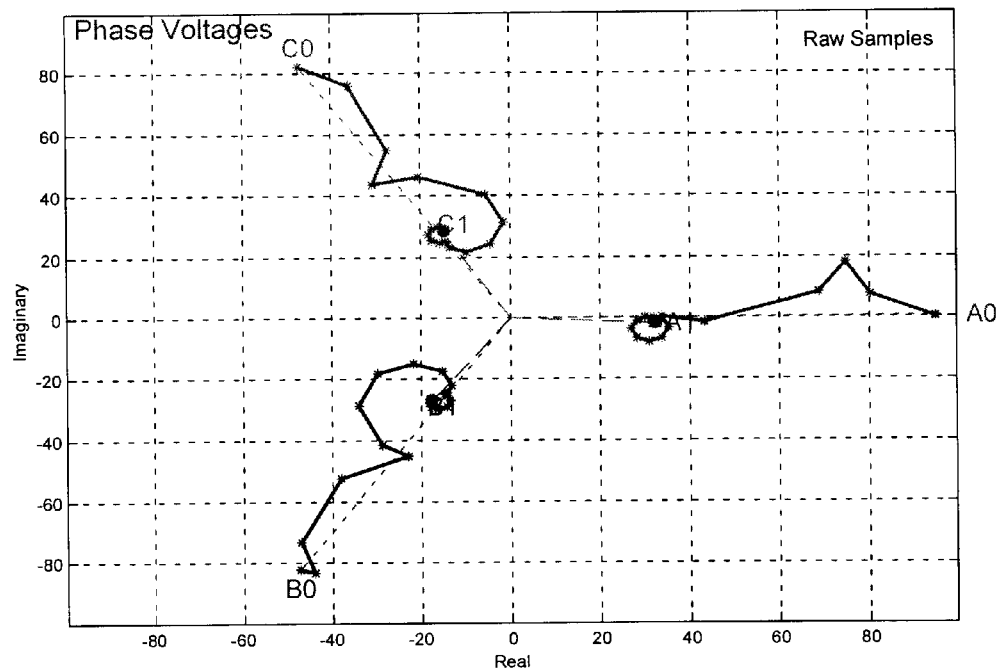
FIGS. 9 and 10 are plots of the phasors of the voltage signals of FIG. 4 as estimated by the Fourier algorithm applied to raw samples.
Figure 10:
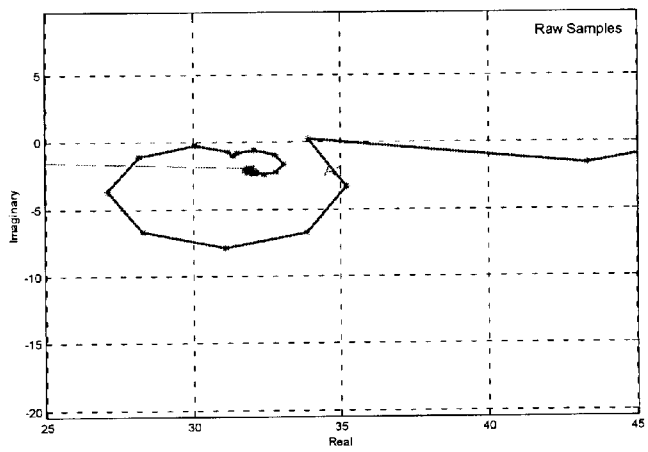

FIG. 9 displays phasors of the three voltages as they move from the pre-fault positions A0, B0 and C0 to their fault positions A1, B1 and C1, and FIG. 10 displays a magnified representation of the phase A phasor at its fault position. The phasors are measured using the raw voltage samples. As seen in FIG. 10, magnifying the phase A phasor at its fault position, the phasor rotates around the final point Al before settling down. If the final phasor value is very small, the estimated phasor rotates around the origin (0,0) and causes the directional and distance elements to malfunction.

Figure 11:
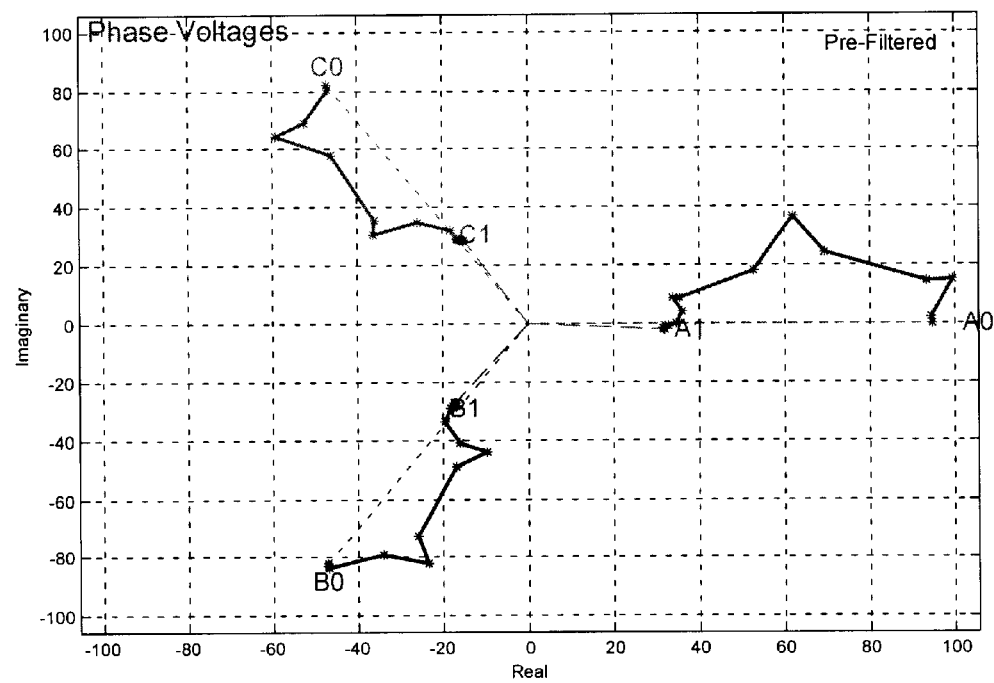
FIGS. 11 and 12 are plots of the phasors of the voltage signals of FIG. 4 as estimated by the Fourier algorithm applied to a pre-filtered signal according to the present invention.
Figure 12:
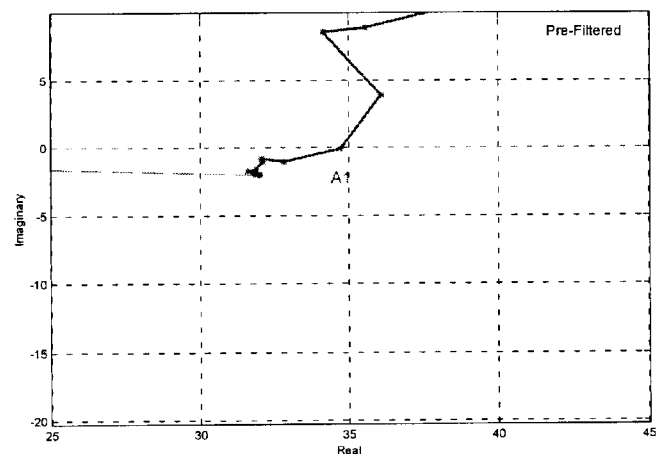

FIG. 11 presents the same measurement process but using the filter of FIGS. 1–2. The phasors settle at their final values A1, B1 and C1 without any rotation. This illustrates how the filter improves the accuracy of the distance and directional protection elements of microprocessor based relays.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A filter for a circuit protection device, comprising:

a first filter device connected to receive an input signal v, the first filtering device generating an intermediate signal v1, wherein $$v_{1(k)} = \sum_{n=0}^{x} h_n \cdot v_{(k-n)},$$

where k is a sample index, and $h_0 \ldots h_x$ are first filter coefficients; and a second filtering device connected to receive said intermediate signal v1 from said first filtering device, and to generate an output signal v2, wherein $$v_{2(k)} = \sum_{n=0}^{y} g_n \cdot v_{1(k-n)},$$

where $g_0 \ldots g_y$ are second filter coefficients, the second filtering device connected to provide the output signal v2 to a Fourier algorithm.

2. The filter of claim 1, wherein the input signal is a voltage signal supplied from a capacitive voltage transformer.

3. The filter of claim 1, wherein the circuit protection device is a microprocessor-based protective relay.

4. The filter of claim 3, wherein the microprocessor controls the first and second filtering devices.

5. The filter of claim 1, wherein the output signal from said second filtering device operates at least one protection function of said circuit protection device.

6. A method of filtering a signal for a circuit protection device, comprising the steps of:

receiving an input signal v in a first filtering device;

generating an intermediate signal v1 in said first filtering device, wherein $$v_{1(k)} = \sum_{n=0}^{x} h_n \cdot v_{(k-n)},$$

and supplying the intermediate signal v1 to a second filtering device;

receiving said signal in a second filtering device;

generating an output signal v2 in said second filtering device, wherein $$v_{2(k)} = \sum_{n=0}^{y} g_n \cdot v_{1(k-n)};$$

and using the output signal to effect protective control in the circuit protection device.

7. The method of claim 6, wherein the circuit protection device is a microprocessor-based protective relay.

8. The method of claim 6, further comprising the step of processing the output signal using a Fourier algorithm prior to the step of using.

9. The method of claim 6, wherein the input signal is a voltage signal representative of a condition in a power system.

10. The method of claim 9, wherein the input signal is received from a capacitive voltage transformer associated with the power system.

11. The method of claim 6, wherein the steps of generating are performed by a microprocessor.

12. A protective relay for providing protective control to a power system comprising:
   a first connection to the power system to receive an input signal v indicative of a present condition of the power system; and
   a microprocessor programmed to provide protective control functions based on at least the input signal, the microprocessor performing a filtering of the input signal v to generate an output signal $$v_{2(k)} = \sum_{n=0}^{z} b_n \cdot v_{(k-n)},$$

wherein the microprocessor performs a first filtering of the input signal v to generate a first intermediate signal v1, wherein $$v_{1(k)} = \sum_{n=0}^{x} h_n \cdot v_{(k-n)},$$

and by performing a second filtering of the intermediate signal to generate a second intermediate signal v2, wherein $$v_{2(k)} = \sum_{n=0}^{y} g_n \cdot v_{1(k-n)}.$$

13. The protective relay of claim 12, wherein the microprocessor is further programmed to apply a Fourier algorithm to the output signal to generate a control signal, and to perform the protective control functions based on the control signal.

14. The protective relay of claim 12, wherein the input signal v is a voltage signal.

15. The protective relay of claim 14, wherein the input signal v is received from a capacitive voltage transformer associated with the power system.

16. A machine-readable storage medium encoded with machine-readable language comprising:
   one or more instructions for receiving an input signal v indicative of a present condition of a power system;
   one or more instructions for filtering the input signal v to generate an intermediate signal v1, wherein $$v_{1(k)} = \sum_{n=0}^{x} h_n \cdot v_{(k-n)};$$

and
   one or more instructions for filtering the intermediate signal vl to generate an output signal v2, wherein $$v_{2(k)} = \sum_{n=0}^{y} g_n \cdot v_{1(k-n)}.$$

17. The medium of claim 16, wherein the input signal v is a voltage signal received from a capacitive voltage transformer associated with the power system.

18. The medium of claim 16, further comprising one or more instructions for applying a Fourier algorithm to the output signal v2 to generate a control signal.

19. The medium of claim 18, further comprising one or more instructions for performing one or more protective control functions on the power system based on the control signal.

20. The medium of claim 18, further comprising one or more instructions for performing one or more protective control functions on the power system based on the control signal and on a second input signal received from the power system.

21. The medium of claim 20, wherein the second input signal is a current signal indicative of a present current condition on the power system.

* * * * *